(12) United States Patent
Lee

(10) Patent No.: US 10,612,259 B2
(45) Date of Patent: Apr. 7, 2020

(54) VEHICLE REPAIR DOCK

(71) Applicant: Yong Man Lee, Chungcheongbuk-Do (KR)

(72) Inventor: Yong Man Lee, Chungcheongbuk-Do (KR)

(73) Assignee: Yong Man Lee, Chungcheongbuk-Do (KR)

( * ) Notice: Subject to any disclaimer, the term of this patent is extended or adjusted under 35 U.S.C. 154(b) by 0 days.

(21) Appl. No.: 16/063,344

(22) PCT Filed: Nov. 11, 2016

(86) PCT No.: PCT/KR2016/012969
§ 371 (c)(1),
(2) Date: Jun. 18, 2018

(87) PCT Pub. No.: WO2017/104975
PCT Pub. Date: Jun. 22, 2017

(65) Prior Publication Data
US 2018/0363315 A1    Dec. 20, 2018

(30) Foreign Application Priority Data

Dec. 18, 2015 (KR) .......................... 10-2015-0182043

(51) Int. Cl.
*E04H 5/06* (2006.01)
*B60S 5/00* (2006.01)
*E04F 11/02* (2006.01)

(52) U.S. Cl.
CPC ................. *E04H 5/06* (2013.01); *B60S 5/00* (2013.01); *E04F 11/02* (2013.01)

(58) Field of Classification Search
CPC .............. F01M 11/04; B60S 5/00; E04H 5/06
See application file for complete search history.

(56) References Cited

U.S. PATENT DOCUMENTS

| 3,603,046 A | * | 9/1971 | Humphrey, Jr. | .......... E04H 5/06 52/173.1 |
| 4,188,985 A | * | 2/1980 | Osterman | ................. E04H 5/06 137/234.6 |

(Continued)

FOREIGN PATENT DOCUMENTS

| CN | 106968259 A | * | 7/2017 | |
| DE | 1085325 B | * | 7/1960 | ................ B60S 5/00 |

(Continued)

OTHER PUBLICATIONS

DE1434752_Machine_translate (Year: 1971).*

(Continued)

*Primary Examiner* — Babajide A Demuren
(74) *Attorney, Agent, or Firm* — Harness, Dickey & Pierce, P.L.C.

(57) ABSTRACT

Disclosed is a vehicle maintenance dock including: a work space provided to elongate in a first direction, and formed to be dug in a predetermined depth with respect to a ground surface, and is provided to have an opened upper surface; and a plurality of vehicle support modules provided to shield one side of the opened upper surface of the work space and guiding a maintenance target vehicle to enter in a second direction inclined to the first direction and provided so that a maintenance target area of the maintenance target vehicle is exposed to the work space and continuously arranged in the first direction and arranged to be parallel to each other.

5 Claims, 3 Drawing Sheets

(56) References Cited

U.S. PATENT DOCUMENTS

| | | | | |
|---|---|---|---|---|
| 4,762,242 A | * | 8/1988 | Harris | E04H 5/06 |
| | | | | 137/234.6 |
| 5,701,706 A | * | 12/1997 | Kreysler | E02D 29/12 |
| | | | | 137/234.6 |
| 10,053,884 B1 | * | 8/2018 | Shinn | E04H 5/06 |

FOREIGN PATENT DOCUMENTS

| | | | | | |
|---|---|---|---|---|---|
| DE | 1434752 B1 | * | 7/1971 | | E04H 5/06 |
| EP | 2098662 B1 | * | 7/2016 | | E04H 5/06 |
| FR | 2404083 A | * | 5/1979 | | |
| JP | 2000-289581 A | | 10/2000 | | |
| JP | 2001-180365 A | | 7/2001 | | |
| JP | 2007-084226 A | | 4/2007 | | |
| KR | 10-2004-0060072 A | | 7/2004 | | |
| KR | 10-2013-0124145 A | | 11/2013 | | |

OTHER PUBLICATIONS

International Search Report from corresponding PCT Application No. PCT/KR2016/012969, dated Feb. 10, 2017, and it's English translation.

* cited by examiner

VEHICLE REPAIR DOCK

CROSS-REFERENCE TO RELATED APPLICATIONS

This application is a national phase application of PCT Application No. PCT/KR2016/012969, filed on Nov. 11, 2016, which claims the benefit and priority to Korean Patent Application No. 10-2015-0182043, filed Dec. 18, 2015. The entire disclosures of the applications identified in this paragraph are incorporated herein by references.

TECHNICAL FIELD

The present disclosure relates to a vehicle maintenance dock and more particularly, to a vehicle maintenance dock capable of maintaining a plurality of vehicles in one dock.

BACKGROUND

This section provides background information related to the present disclosure which is not necessarily prior art.

Generally, in a vehicle inspection station or maintenance shop, a car dock for inspecting or maintaining the lower portion of the vehicle is provided.

As illustrated in FIG. 1, the dock 1 is provided with a work space 2 which is smaller than both widths of the wheels of a vehicle 3 and allows a worker to enter and exit.

Then, after the vehicle enters a longitudinal direction of the dock 1, the operator enters the work space 2 and inspects or manages the lower portion of the vehicle.

In this regard, in Korean Patent Laid-Open Publication No. 10-2013-0124145, there is disclosed a protection device for preventing an operator from falling off the dock, which includes guide rails provided at both ends of an operating space, a protection portion which is supported to the guide rails and provided to prevent the operator from falling off while reciprocating sliding, and a power supply portion providing power to the protection portion so that the reciprocating sliding is continued.

Further, in Korean Patent Laid-Open Publication No. 10-2004-0060072, there is disclosed a lift for a vehicle maintenance dock, in which a support plate capable of vertically moving is provided inside a dock used for maintenance of a vehicle, so that maintenance of the vehicle can be easily performed.

Such related technologies relate to a protection device for safety of operators or a lifting device that facilitates a maintenance operation, and there is no technology relating to a structure of the dock for improving the productivity of a vehicle maintenance company.

Specifically, since the related technologies have a structure in which only one vehicle can enter into one dock, a mechanic repeats a process of entering the operating space after an allocated maintenance target vehicle enters into the dock, performing maintenance, and then discharging the vehicle to deliver the vehicle to customers. This causes a significant decrease in maintenance productivity.

In order to solve this problem, even if the operator is responsible for entering and exiting the vehicle separately from the mechanic, there is still productivity deterioration that a mechanic needs to wait in an operating space for a time of entering and exiting the vehicle.

On the other hand, like the related technologies, according to a structure in which only one vehicle can be entered into one dock, in order to quickly maintain a plurality of vehicles, a plurality of docks need to be formed in the maintenance station, so space utilization is reduced.

SUMMARY

Technical Problem

An object of the present invention is to provide a vehicle maintenance dock having a structure in which a mechanic may continuously perform maintenance of a vehicle in a work space without waiting time.

An object of the present invention is to provide a vehicle maintenance dock having a structure capable of enhancing spatial utilization of a maintenance space.

Technical Solution

This section provides a general summary of the disclosure and is not a comprehensive disclosure of its full scope or all of its features.

In order to achieve the objects, a vehicle maintenance dock according to an aspect of the present invention includes: a work space provided to elongate in a first direction, and formed to be dug in a predetermined depth with respect to a ground surface, and is provided to have an opened upper surface; and a plurality of vehicle support modules provided to shield one side of the opened upper surface of the work space and guiding a maintenance target vehicle to enter in a second direction inclined to the first direction and provided so that a maintenance target area of the maintenance target vehicle is exposed to the work space and continuously arranged in the first direction and arranged to be parallel to each other.

In the vehicle maintenance dock according to an aspect of the present invention, each of the plurality of vehicle support modules preferably includes first and second support plates disposed to elongate in the second direction so that both ends thereof are disposed at one side and the other side in a width direction of the work space and have widths larger than the widths of left and right wheels so as to support the left and right wheels of the maintenance target vehicle, respectively and are provided to be parallel to each other by an interval between the left and right wheels, and a working opening as an interval between the first and second support plates which is provided in an opened state and communicates with the working space.

In the vehicle maintenance dock according to an aspect of the present invention, each of the first and second support plates preferably includes a support frame forming a periphery and formed of a columnar steel, and punched plate members which are coupled to the support frames and provided as a wheel movement path of the maintenance target vehicle.

In the vehicle maintenance dock according to an aspect of the present invention, each of the plurality of vehicle support modules preferably further includes a reinforcing plate as a reinforcing plate which is provided to elongate in a direction orthogonal to the second direction preferably further includes a reinforcing plate of which both ends are fixed to the first and second support plates, respectively and which is located at the center in the width direction of the work space.

In the vehicle maintenance dock according to an aspect of the present invention, an acute angle between the first and second directions is preferably provided to be 30 to 90 degrees.

In the vehicle maintenance dock according to an aspect of the present invention, the maintenance target area is preferably half of the entire lower portion of the maintenance target vehicle.

In the vehicle maintenance dock according to an aspect of the present invention, two maintenance target vehicles preferably simultaneously enter any one of the plurality of vehicle support modules.

The vehicle maintenance dock according to an aspect of the present invention preferably further includes a guide bumper provided in at least one of the first and second support plates, provided in the second direction and guiding a maximum entrance position of the maintenance target vehicle by preventing movement of the wheel of the maintenance target vehicle.

The vehicle maintenance dock according to an aspect of the present invention preferably further includes: an opened hole provided in at least one of the first and second support plates, and provided to communicate with the work space and provided as an inlet through which the worker moves to the work space; and a movement step extending from one side of the periphery defining the opened hole to the work space.

Advantageous Effects

According to the present invention, since a plurality of vehicles can simultaneously enter one work space, a mechanic can progress maintenance without waiting time, and as a result, productivity is enhanced.

According to the present invention, a plurality of vehicle support modules is continuously disposed in one work space, and as a result, the plurality of vehicles can enter the maintenance space to enhance spatial efficiency.

DETAILED DESCRIPTION

Hereinafter, various embodiments for implementing a vehicle maintenance dock according to the present disclosure will be described with reference to the drawings.

However, it is to be understood that the scope of the present disclosure is not limited by the embodiments described below, and those skilled in the art, which understands the spirit of the present disclosure can easily propose various embodiments included in the scope of the same technical spirit as the present disclosure by a method such as substitution or change, but it will be apparent that this is also included in the technical spirit of the present disclosure.

Further, since terms used below are selected for easy description, the terms are not limited to dictionary meanings and should be appropriately interpreted as meanings consistent with the technical spirit of the present disclosure in order to grasp the technical content of the present disclosure.

Figure 1:
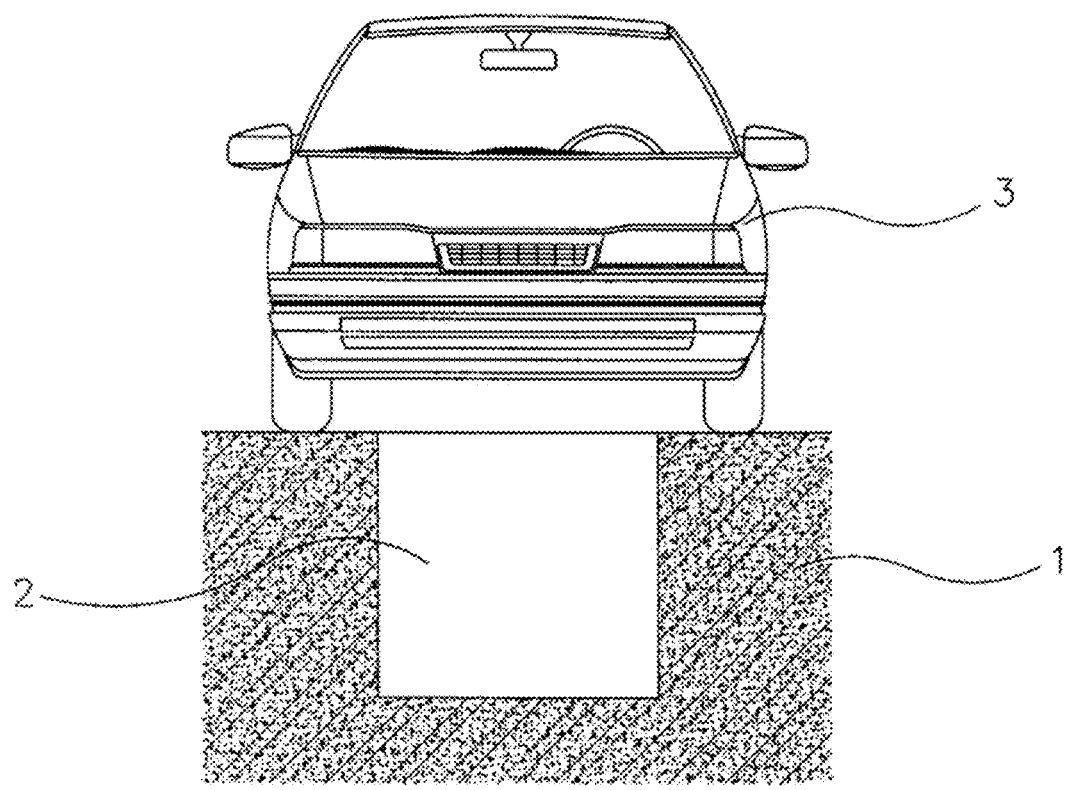
FIG. 1 is a diagram illustrating one example of a vehicle maintenance dock in the related art.
Figure 2:
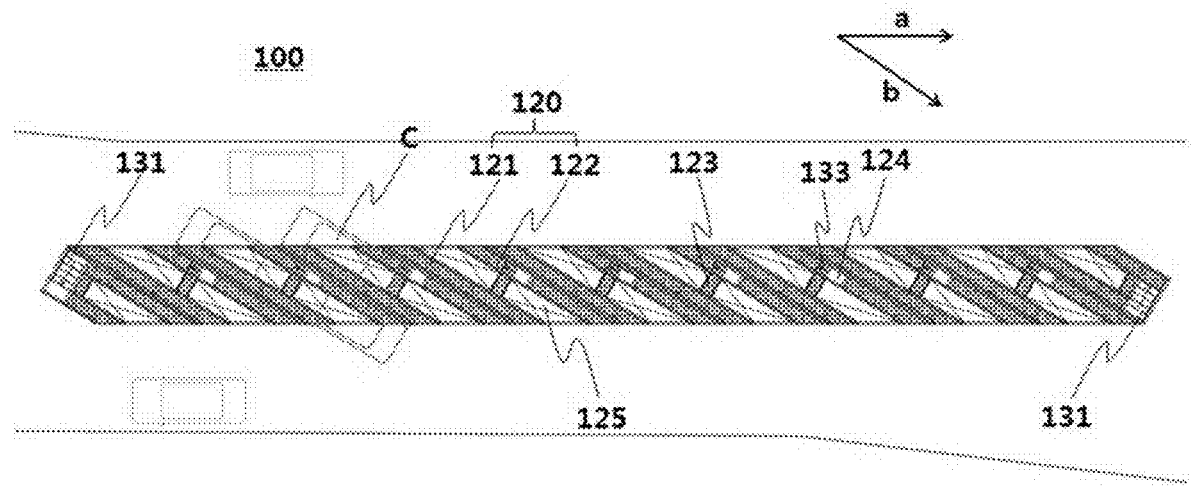
FIG. 2 is a diagram schematically illustrating a vehicle maintenance dock according to a first embodiment of the present invention.
Figure 3:
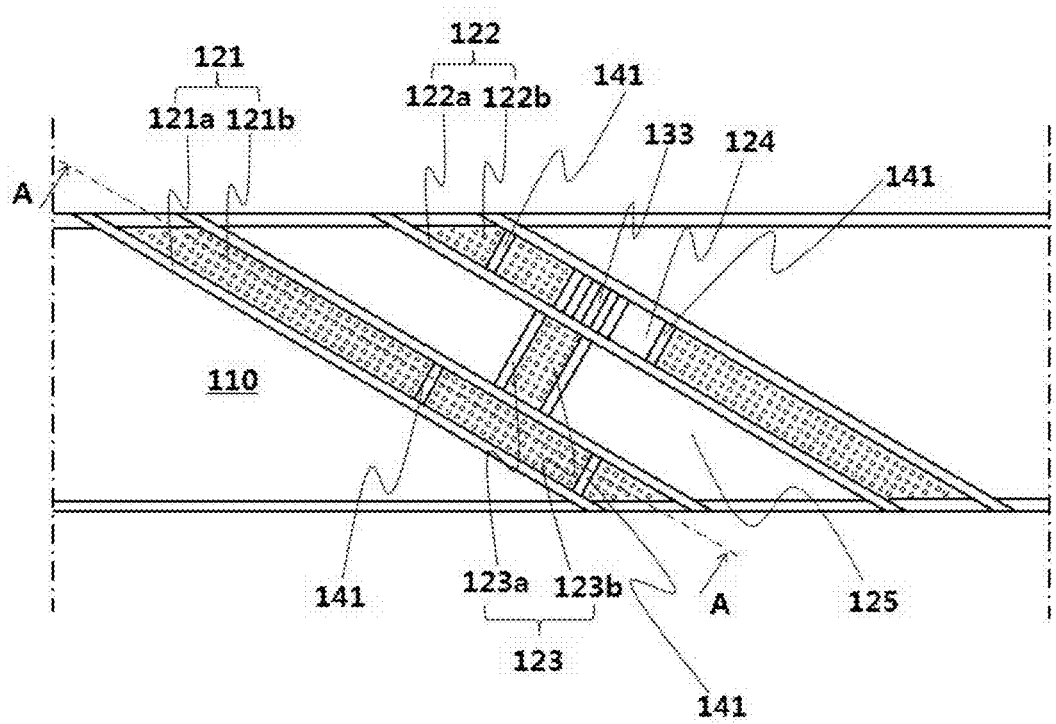
FIG. 3 is an enlarged diagram of a vehicle support module in FIG. 2.
Figure 4:
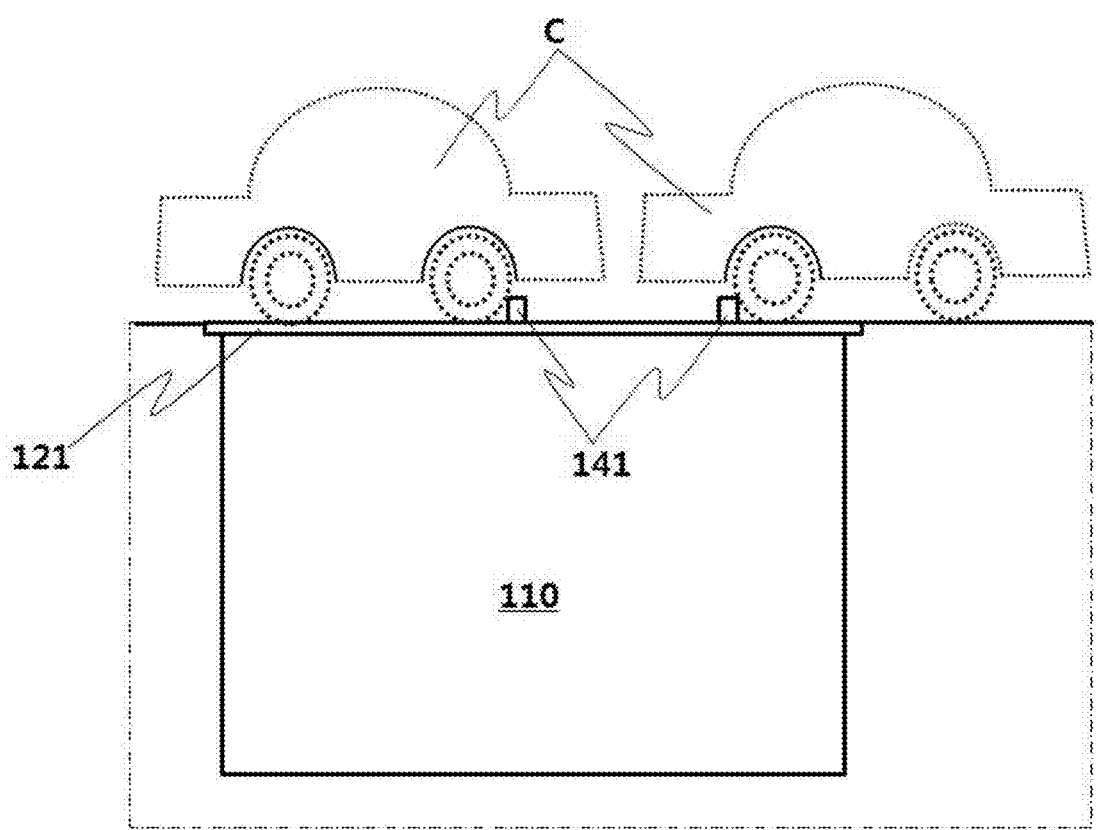
FIG. 4 is a cross-sectional view of FIG. 2 taken along the line A-A.

FIG. 2 is a diagram schematically illustrating a vehicle maintenance dock according to a first embodiment of the present invention, FIG. 3 is an enlarged diagram of a vehicle support module in FIG. 2, and FIG. 4 is a cross-sectional view of FIG. 2 taken along the line A-A.

Referring to FIGS. 2, 3, and 4, a vehicle maintenance dock 100 according to the embodiment includes a work space 110 and a plurality of vehicle support modules 120.

The work space 110 is provided in a space where a mechanic is located for maintenance at a lower portion of a maintenance target vehicle C.

The work space 110 is provided to elongate in a first direction (a), and is formed to be dug in a predetermined depth with respect to a ground surface, and is provided to have an opened upper surface. The work space 110 may be provided in a rectangular parallelepiped shape that is long in the first direction (a).

The height of the work space 110, that is, a depth of the ground surface, may be provided to such a degree that the mechanic may smoothly carry out work at the lower portion of the vehicle.

It may be conceived that the height of the work space 110 may be higher than the height of the mechanic, but since the height of the mechanic is not constant, the height of the work space 110 may be provided to adjust the height of the vehicle support module 120 to be described below.

The vehicle support module 120 is configured to locate the maintenance target vehicle C on the opened upper surface of the work space 110 and support the maintenance target vehicle C such that the mechanic located in the work space 110 may maintain the lower portion of the maintenance target vehicle C.

The vehicle support module 120 is provided to shield one side of the open upper surface of the work space 110.

Further, the vehicle support module 120 is provided to guide the maintenance target vehicle C to enter in a second direction (b) inclined with respect to the first direction (a).

In addition, the vehicle support module 120 is provided such that the lower portion of the maintenance target vehicle C, that is, a maintenance target area, is exposed to the work space 110.

Meanwhile, the vehicle support modules 120 are continuously arranged in the first direction (a) and arranged to be parallel to each other. That is, a plurality of vehicle support modules 120 is provided.

As a result, the plurality of maintenance target vehicles may simultaneously enter one work space, and the mechanic may continuously maintain a plurality of maintenance target vehicles while moving inside the work space.

Herein, the width of the work space 110 is preferably provided to be 2.5 to 3.5 m, and the length of the work space 110 in the first direction (a) may be designed in consideration of an area of a maintenance place.

Further, an angle (acute angle) between the first direction (a) and the second direction (b) is preferably provided to be 30 to 90 degrees. As the angle becomes smaller, the entry and exit of the maintenance target vehicle C becomes easier, and the maintenance target vehicle obliquely enters and is discharged. Therefore, a total area of the maintenance space becomes relatively small, while the maximum number of maintenance target vehicles which are accommodated in the length in the first direction (a) decreases, and as the angle becomes larger, the opposite effect is obtained.

Meanwhile, the present inventor finds that as a result of comparing a case of a vehicle maintenance dock according to the present disclosure in which the work space 110 is formed with a length of 15 m and a width of 3 m in the first direction (a) and the angle (acute angle) formed by the first direction (a) and the second direction (b) is set to 30° and maintenance productivity (the number of maintenance operations which one mechanic and one worker which is in charge of the entry and the exit of the vehicle may process per hour) for a case where a plurality of (approximately 7) work spaces (the width of 1.5 m and the length of 4 m) in the related art is installed, it can be seen that a time period for which the mechanic moves in a plurality of work spaces is shortened and the productivity is enhanced by 1.5 times according to the present invention and according to the present invention, it can be seen that since a wheel part of the maintenance target vehicle is located at an upper portion of the work space, the total area of the maintenance space is reduced.

Meanwhile, in the embodiment, the vehicle support module 120 may be configured to include first and second support plates 121 and 122 and a working opening 125.

The first and second support plates 121 and 122 are disposed to elongate in the second direction (b) so that both ends thereof are disposed at one side and the other side in a width direction of the work space 110 and have widths larger than the widths of left and right wheels so as to support the left and right wheels of the maintenance target vehicle C, respectively and are provided to be parallel to each other by an interval between the left and right wheels.

Herein, the first and second support plates 121 and 122 may form a periphery and may include support frames 121*a* and 122*a* formed of a columnar steel and punched plate members 121*b* and 122*b* which are coupled to the support frames 121*a* and 122*a* and provided as a wheel movement path of the maintenance target vehicle C. Herein, the punched plate members 121*b* and 122*b* are used to increase friction force of the wheel and not to interrupt an eye of the mechanic.

The working opening 125 as an interval between the first and second support plates 121 and 122 is provided in an opened state and communicates with the working space 110.

Thus, the mechanic may maintain the maintenance target vehicle C supported by the first and second support plates 121 and 122 through the work opening 125.

Meanwhile, in the embodiment, the vehicle support module 120 as a reinforcing plate 123 which is provided to elongate in a direction orthogonal to the second direction (b) preferably further includes a reinforcing plate 123 of which both ends are fixed to the first and second support plates 121 and 122, respectively and which is located at the center in the width direction of the work space 110.

Herein, of course, the reinforcing plate 123 may be constituted by a support frame 123*a* and a punched plate material 123*b* forming the periphery similarly to the first and second support plates 121 and 122.

Meanwhile, in the embodiment, an opened hole 124 is provided in at least one of the first and second support plates 121 and 122, and the opened hole 124 may be further provided, which is provided to communicate with the work space 110 and provided as an inlet through which the worker moves to the work space.

In addition, it is preferable to further include a movement step 133 extending from one side of the periphery defining the opened hole 124 to the work space.

The work space 110 is generally provided with entrance and exit steps 131 for entry or exit of the worker at both ends in the first direction (a), but the movement step 133 is provided on the first and second support plates 121 and 122, thereby minimizing a moving line along which the worker enters or exits the work space.

Meanwhile, in the embodiment, a maintenance target area exposed in the work space 110, that is, the lower portion of the maintenance target vehicle is preferably half of the entire lower portion of the maintenance target vehicle, that is, the lower portion of any one of a front portion and a rear portion in a longitudinal direction of the maintenance target vehicle.

This is to enhance the maintenance productivity considering that most of the vehicle maintenance is the front portion where an engine is located. Two maintenance target vehicles may simultaneously enter one vehicle support module 120, thereby further enhancing the maintenance productivity.

Meanwhile, in the embodiment, a guide bumper 141 is provided in at least one of the first and second support plates 121 and 122 and the guide bumper 141 is preferably further provided, which is provided in the second direction (b) and guides a maximum entrance position of the maintenance target vehicle C by preventing movement of the wheel of the maintenance target vehicle C.

What is claimed is:

1. A vehicle maintenance dock comprising:
   a work space provided to elongate in a first direction, and formed to be dug in a predetermined depth with respect to a ground surface, and is provided to have an opened upper surface; and
   a plurality of vehicle support modules provided to shield one side of the opened upper surface of the work space and guiding a maintenance target vehicle to enter in a second direction inclined to the first direction and provided so that a maintenance target area of the maintenance target vehicle is exposed to the work space and continuously arranged in the first direction and arranged to be parallel to each other,
   wherein each of the plurality of vehicle support modules includes
      first and second support plates disposed to elongate in the second direction so that both ends thereof are disposed at one side and the other side in a width direction of the work space and have widths larger than widths of the left and right wheels of the maintenance target vehicle so as to support the left and right wheels of the maintenance target vehicle, respectively and are provided to be parallel to each other by an interval between the left and right wheels, and
      a working opening as an interval between the first and second support plates which is provided in an opened state and communicates with the working space
   further comprising:
      an opened hole provided in at least one of the first and second support plates, and provided to communicate with the work space and provided as an inlet through which the worker moves to the work space; and
      a movement step extending from one side of the periphery defining the opened hole to the work space.

2. The vehicle maintenance dock of claim 1, wherein each of the first and second support plates includes
   a support frame forming a periphery and formed of a columnar steel, and
   punched plate members which are coupled to the support frames and provided as a wheel movement path of the maintenance target vehicle.

3. The vehicle maintenance dock of claim 1, wherein each of the plurality of vehicle support modules further includes a reinforcing plate as a reinforcing plate which is provided to elongate in a direction orthogonal to the second direction of which both ends are fixed to the first and second support plates, respectively and which is located at the center in the width direction of the work space.

4. The vehicle maintenance dock of claim 1, wherein an acute angle between the first and second directions is provided to be 30 to 90 degrees.

5. The vehicle maintenance dock of claim 1, further comprising:
- a guide bumper provided in at least one of the first and second support plates, provided in the second direction and guiding a maximum entrance position of the maintenance target vehicle by preventing movement of the wheel of the maintenance target vehicle,
- wherein two maintenance target vehicles simultaneously enter any one of the plurality of vehicle support modules.

* * * * *